April 1, 1958  G. SPIESS ET AL  2,828,832
DEVICE ON ELEVATORS FOR STOPPING EXACTLY AT FLOOR LEVEL
Filed Aug. 9, 1955  2 Sheets-Sheet 1

INVENTORS
GUSTAV SPIESS
KARL STUTZ
BY
ATTORNEY

April 1, 1958 G. SPIESS ET AL 2,828,832
DEVICE ON ELEVATORS FOR STOPPING EXACTLY AT FLOOR LEVEL
Filed Aug. 9, 1955 2 Sheets-Sheet 2
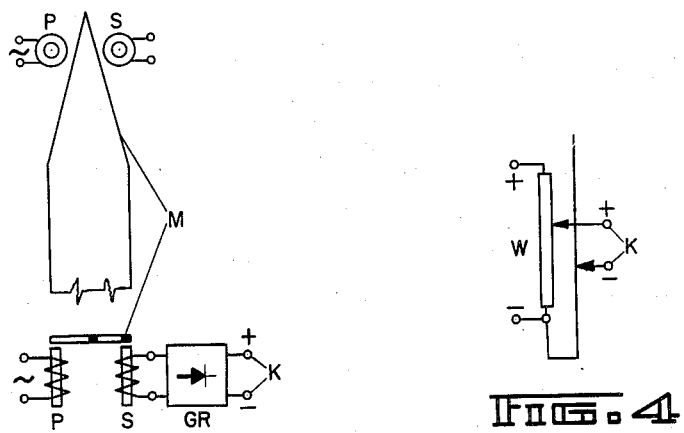
FIG. 2
FIG. 4
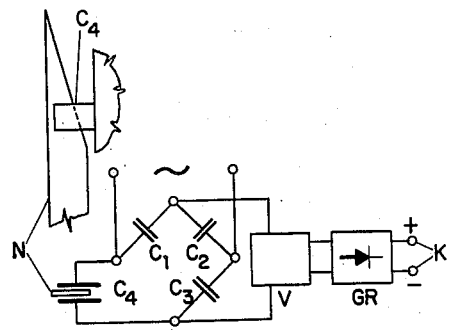
FIG. 3
INVENTORS
GUSTAV SPIESS
KARL STUTZ
BY
ATTORNEY.

United States Patent Office 2,828,832
Patented Apr. 1, 1958

2,828,832

DEVICE ON ELEVATORS FOR STOPPING EXACTLY AT FLOOR LEVEL

Gustav Spiess and Karl Stutz, Lucerne, Switzerland, assignors to Inventio Aktiengesellschaft, Hergiswil, Switzerland, a Swiss firm Application August 9, 1955, Serial No. 527,331

Claims priority, application Switzerland August 12, 1954

6 Claims. (Cl. 187—29)

With devices on elevators for stopping exactly at floor level, it has hitherto been necessary for accuracy of stopping to approach the floor level with a longer or shorter period of slow running, depending on the loading of the elevator.

The purpose of the present invention is to create a device for the exact stopping at floor level, which will allow of bringing the elevator under any load direct to floor level without any slow running.

According to the invention, this result is obtained by a device which has a rotor rotatable in a magnetic field, and also a tachometer dynamo, the two being coupled to the hoisting motor, further means, arranged partly on the elevator cage and partly on the different floors, for regulating the voltage of a source of voltage in dependence on the braking path, and an amplifier for supplying exciting current for the magnetic field, with a control grid which is connected to the difference between the voltages of the tachometer dynamo and of the voltage source, these two voltages being arranged to oppose each other.

The above, and other objects, features and advantages of the invention, will be apparent in the following detailed description of illustrative embodiments thereof which is to be read in connection with the accompanying drawings forming a part hereof, and wherein:

Fig. 2 is a diagrammatic view of an assembly that can be substituted in the device of Fig. 1 in accordance with another embodiment of the invention;

Fig. 3 is a diagrammatic view of an assembly that can be substituted in the device of Fig. 1 in accordance with another embodiment of the invention; and Fig. 4 is a diagrammatic view of an assembly that can be substituted in the device of Fig. 1 in accordance with still another embodiment of the invention.

Figure 1:
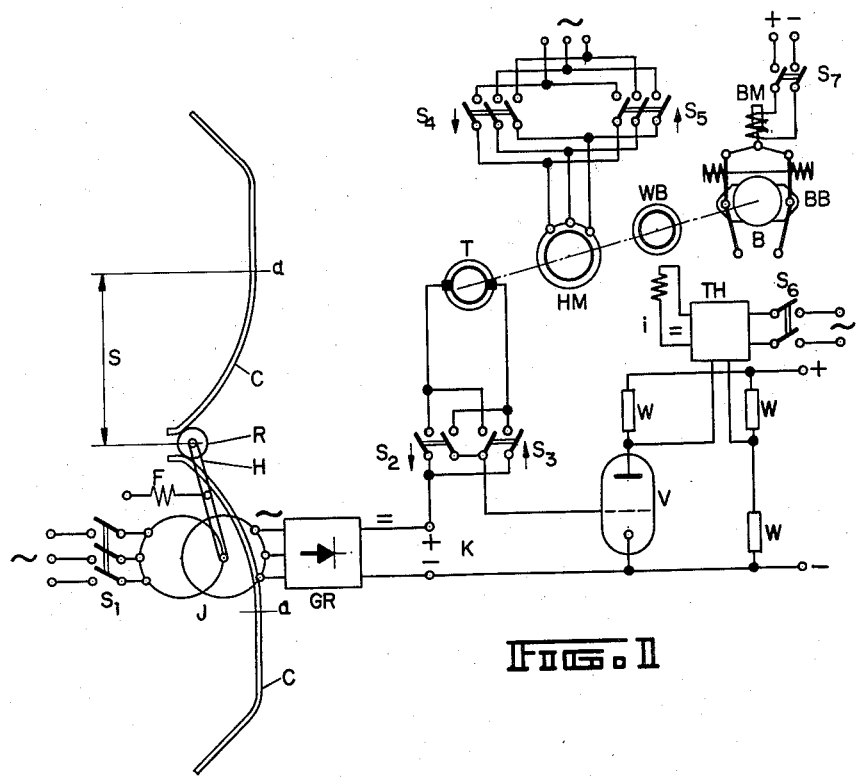
Fig. 1 is a diagrammatic view of a device embodying the present invention.

In the embodiment according to Fig. 1, a main motor HM is provided for driving the winch (not illustrated) for the elevator cage or car and can be connected to a three-phase supply system through two switches $S_4$ and $S_5$. The motor HM is coupled to a tachometer dynamo T, an eddy-current brake WB, and a brake drum B of a magnetic brake. The brake shoes BB of the brake are pressed against the brake drum B by means of springs and may be released by means of a magnet BM, which is connected through a switch $S_7$ to a D. C. supply system.

At the separate floors, control cams C are arranged, one for the upward travel and one for the downward travel. A roller R, fitted on a lever arm H, is urged, by means of a spring F, against one of the cams C in such a way that the lever arm is swung in one direction. The lever arm H is connected to the rotatable part of an induction regulator J, the primary part of which is connected to a three-phase supply system through a switch $S_1$. The secondary voltage of the induction regulator J is connected to a rectifier GR, from which a direct current voltage proportional to the secondary voltage is taken and led to terminals K.

Through switch $S_2$ or $S_3$ (depending on the direction of travel), the voltage of the tachometer dynamo T is opposed to the voltage at the terminals K and the resultant voltage applied to the control grid of an amplifying tube V.

The anode current of the amplifying tube V controls a rectifier TH with thyratron tubes, for feeding the exciter winding of the eddy-current brake WB with a current $i$. The rectifier TH is connected to an A. C. supply system by means of a switch $S_6$. The anode of the tube V and the thyratron rectifier are further connected through resistances W to the terminals of a D. C. supply in a conventional manner.

Figure 1A:
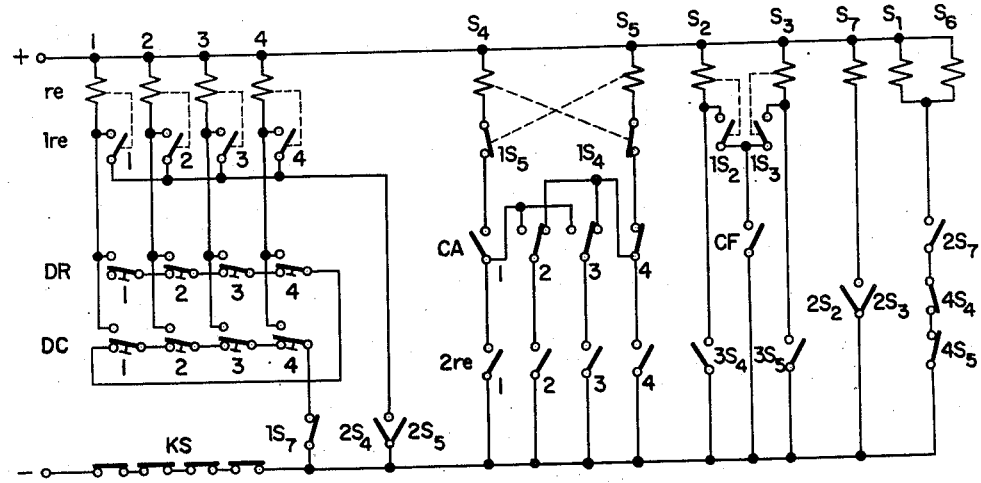
Fig. 1a is a wiring diagram of a push button control means associated with the device of Fig. 1.

The wiring for controlling the device of Fig. 1 is illustrated in Fig. 1a.

In order to provide automatic pushbutton control for an elevator servicing four floors, there are provided, in the cage, the pushbuttons $DC_{1-4}$ and, at the several floors, the calling pushbuttons $DR_{1-4}$. Contacts KS actuated by the elevator shaft doors prevent operation of the elevator when a door is open.

The landing relays $re_{1-4}$ each have a self-holding contact $1re_{1-4}$ and a working contact $2re_{1-4}$.

The switches $S_1$—$S_7$ are solenoid actuated and are shown in Fig. 1a with their magnet coils actuating the main contacts shown in Fig. 1. Some of these switches are provided with auxiliary contacts. Specifically, switch $S_2$ has a self-holding contact $1S_2$ and an open circuit contact $2S_2$; switch $S_3$ has a self-holding contact $1S_3$ and an open circuit contact $2S_3$; switch $S_4$ has two closed circuit contacts $1S_4$ and $4S_4$ and two open circuit contacts $2S_4$ and $3S_4$; switch $S_5$ has two closed circuit contacts $1S_5$ and $4S_5$ and two open circuit contacts $2S_5$ and $3S_5$; and switch $S_7$ has a closed circuit contact $1S_7$ and an open circuit contact $2S_7$.

The copying gear has, for each floor, a contact $CA_{1-4}$, which is set in a medium position as soon as the roller R has reached the point $a$ on the related cams C. A common contact CF on the copying gear is opened only when the bottom of the cage is exactly aligned with a floor.

The operation of the described device is as follows:

Assuming the cage to be disposed at the first floor, pushing the calling pushbutton $DR_3$ on the third floor causes the landing relay $re_3$ to be excited by a circuit extending from the negative terminal, through closed circuit contact $1S_7$, calling pushbutton $DR_3$ and landing relay $re_3$, to the positive terminal.

The landing relay $re_3$ is actuated and closes its contacts $1re_3$ and $2re_3$, so that the switch $S_5$ is excited by a circuit extending from the negative terminal, through contact $2re_3$, copying gear contact $CA_3$, closed circuit contact $1S_4$, and the coil of the switch $S_5$, to the positive terminal.

The switch $S_5$ is actuated and connects the main motor HM, opens the closed circuit contacts $1S_5$ and $4S_5$ and closes the open circuit contacts $2S_5$ and $3S_5$.

The landing relay $re_3$ holds itself through contact $2S_5$ and self-holding contact $1re_3$, so that the calling pushbutton may be released again, while contact $3S_5$ connects switch $S_3$ by a circuit extending from the negative terminal, through contact $3S_5$ and the coil of the switch $S_3$, to the positive terminal. Switch $S_3$ is actuated, connects the tachometer dynamo T, and closes the contacts $1S_3$ (as a preparation for self-holding) and the open circuit contact $2S_3$.

Through contact $2S_3$ switch $S_7$ is actuated by a circuit extending from the negative terminal, through contact $2S_3$ and the coil of switch $S_7$, to the positive terminal.

Switch $S_7$ is actuated and connects the brake release magnet BM, opens the closed circuit contact $1S_7$ and closes the open circuit contact $2S_7$, which for the moment has no effect, since contact $4S_5$ is already opened. Now the cage travels upwards, while the roller R, under the influence of the spring F follows the upper cam C, or alternatively may be spaced from the cam in a manner not shown. When the cage is spaced by a distance S from the third floor, the contact 3CA opens.

Therefore, switch $S_5$ is released and the main motor HM is disconnected.

Closed circuit contacts $1S_5$ and $4S_5$ close, and open circuit contacts $2S_5$ and $3S_5$ open.

The landing relay $re_3$ releases, as its self-holding is interrupted by contact $2S_5$.

Switch $S_3$ remains excited, as it is held through copying gear contact CF and contact $1S_3$. Therefore, switch $S_7$ also remains excited and the brake BB continues in its released condition. Simultaneously, the switches $S_1$ and $S_6$ are excited by a circuit extending from the negative terminal, through contacts $4S_5$, $4S_4$, $2S_7$, and switches $S_1$ and $S_6$, to the positive terminal.

Switch $S_1$ connects the induction regulator J, and switch $S_6$ connects the thyratron rectifier TH, with the A. C. supply system.

The rectified secondary voltage of the induction regulator J on the terminals K in this moment has a value which is equal to the voltage of the tachometer dynamo T. The tube V is fully opened and the thyratron rectifier TH is interrupted, so that the eddy-current brake is not excited.

As the travel of the cage continues the roller R follows the cam C and, in view of the deflection of the lever arm H, the secondary voltage of the induction regulator J, and thus the voltage at the terminals K becomes lower than the tachometer voltage.

The voltage of the control grid of the tube V becomes negative, the anode current increases and opens the thyratron rectifier TH. The eddy-current brake WB is now excited, so that the cage is retarded. The braking operation is controlled in such a way, that the voltage of the tachometer dynamo T decreases in accordance to the voltage at the terminals K.

When the bottom of the cage is exactly at the same level as the floor, the voltage at the terminals K is zero, and, therefore, also the voltage of the tachometer dynamo T has to be zero, the cage being at rest.

At the same time the contact CF on the copying gear is opened, so that switch $S_3$ is released, the tachometer dynamo T disconnected and auxiliary contact $2S_3$ releases switch $S_7$.

The braking magnet is thereby released, so that the mechanical brake BB becomes effective.

The contact $2S_7$ disconnects the switches $S_1$ and $S_6$, the induction regulator J and the thyratron rectifier TH are disconnected from their current supplies.

Another landing relay may then be excited for starting a new travel by means of the pushbuttons DC or DR through the contact $1S_7$, which is closed again.

The voltage, lowering when approaching a floor and opposed to the voltage of the tachometer dynamo, could also, as illustrated in Fig. 2, be taken from a transformer P, S with loose-coupled magnetic circuit, where a coupling piece M, which can be drawn out the magnetic circuit, reduces the coupling and thereby the secondary voltage of the transformer. The coupling piece M is shaped as a flat strip, running to a point at both ends, whereby these ends cause a gradual reduction of the coupling and consequently also of the secondary voltage.

As illustrated in Fig. 1, the terminals K are connected to the tachometer dynamo T and to the grid of the tube V.

According to Fig. 3, a bridge-connection of four capacitors $C_1$, $C_2$, $C_3$ and $C_4$ can be provided, whereby the capacitor $C_4$ has a movable coupling piece N for gradually altering the capacitance of the capacitor $C_4$. Such a coupling piece N, running to a point at each end, is arranged on each floor and, when the elevator is approaching that floor, runs in between the coatings of the capacitor fitted in the cage of the elevator.

To one diagonal of the bridge-connection an alternating-current source is connected, whilst from the other diagonal a variable voltage can be taken, led to a rectifier GR, and taken as direct-current voltage at the terminals K.

For supplying the variable voltage to the terminals K, a potentiometer W may also be provided, as shown in Fig. 4. This is connected to a direct-current source and the variable, gradually reducing voltage is taken off by a sliding contact.

Having now particularly described and ascertained the nature of our said invention and in what manner the same is to be performed, we declare that what we claim is:

1. In a device for controlling the travel of an elevator cage servicing a plurality of floors; the combination of braking means having a rotor rotatable in a magnetic field, a tachometer dynamo and a hoisting motor all coupled together, control means actuable at each of the floors and from within the elevator cage for controlling the operation of said hoisting motor so that the elevator cage may be made to travel from floor to floor, as desired, a source of voltage, regulating means arranged partly on the elevator cage and partly at the different floors to be serviced and operative to regulate the voltage from said source as a function of the position of the elevator cage in relation to the floor to which the cage is being made to travel by said control means, an amplifier for supplying exciting current to said magnetic field of the braking means, said amplifier having a control grid, and means connecting said control grid to said tachometer dynamo and to said regulating means with the voltage from said tachometer dynamo and the regulated voltage from said source opposing each other so that the effect of said braking means is varied in dependence on the position of the elevator cage relative to the floor to which the latter is travelling.

2. In a device for controlling the travel of an elevator cage servicing a plurality of floors; the combination as in claim 1, wherein said regulating means includes control cams arranged at each of the floors to be serviced, a cam follower lever mounted on the elevator cage and engageable with said cams at each floor to be deflected by said cams to an extent dependent upon the position of the cage relative to the floors, and an induction regulator having a primary connected to said source of voltage and a secondary connected so that the voltage at the latter opposes the voltage of said tachometer dynamo, said induction regulator being controlled by said cam follower lever so that the voltage at said secondary is gradually reduced in response to deflection of said lever by said cams as the elevator cage approaches a floor at which the cage is to be stopped.

3. In a device for controlling the travel of an elevator cage servicing a plurality of floors; the combination as in claim 1, wherein said regulating means includes a transformer at each of the floors having its primary connected to said source of voltage and its secondary connected so that the voltage thereof opposes the voltage of said tachometer dynamo, and an adjustable coupling piece movable in the magnetic circuit of said transformer in response to movement of the elevator cage to gradually reduce the secondary voltage of the transformer associated with the floor at which the cage is to be stopped as the cage approaches said floor.

4. In a device for controlling the travel of an elevator cage servicing a plurality of floors; the combination as in claim 1, wherein said regulating means includes a variable capacitor connected to said source, and a coupling piece movable in response to travel of the elevator cage to cause said capacitor to gradually reduce the voltage of said source as the elevator cage approaches a floor at which the latter is to be stopped.

5. In a device for controlling the travel of an elevator cage servicing a plurality of floors; the combination as in claim 1, wherein said regulating means further includes three additional capacitors connected with said variable capacitor to form a bridge-connection.

6. In a device for controlling the travel of an elevator cage servicing a plurality of floors; the combination as in claim 1, wherein said regulating means includes a potentiometer on the elevator cage connected electrically to said source to vary the voltage from the latter, and a sliding contact at each of the floors engageable with said potentiometer to gradually reduce the voltage from the latter as the cage approaches a floor at which it is to be stopped.

No references cited.